Figure 1:
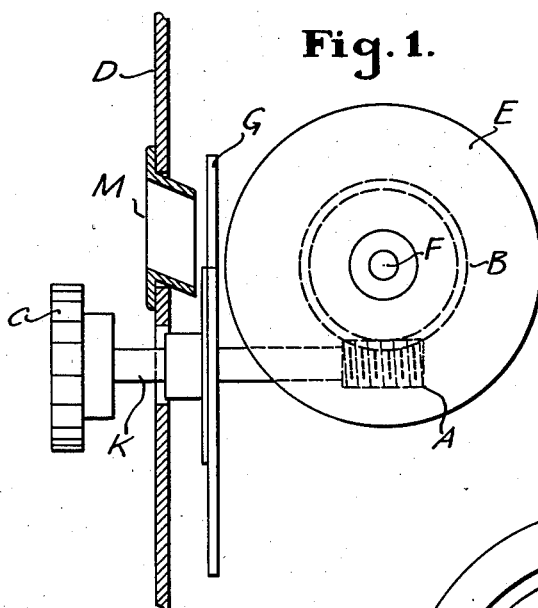

Nov. 18, 1947.   G. L. GRISDALE ET AL   2,431,036
LOGGING SCALES FOR RADIO RECEIVERS
Filed Dec. 6, 1944

INVENTORS.
GEORGE L. GRISDALE
AND HARRY CECIL NORWOOD, DECEASED,
WILLIAM JOHNSTON, EXECUTOR

BY *H. S. Grover*

ATTORNEY

Patented Nov. 18, 1947

2,431,036

UNITED STATES PATENT OFFICE 2,431,036

LOGGING SCALES FOR RADIO RECEIVERS

George Lambert Grisdale, Chelmsford, England, and Harry Cecil Norwood, deceased, late of Chelmsford, England, by William Johnston, executor, Wembley, England, assignors to Radio Corporation of America, a corporation of Delaware Application December 6, 1944, Serial No. 566,914
In Great Britain December 9, 1943

5 Claims. (Cl. 116—124.2)

This invention relates to logging scales suitable for use in, for example, radio receivers.

Although the invention will be described in terms of radio receivers, it is to be understood that the invention resides in the scale itself and its mode of operation, not in the use to which it is put.

It is very often desirable to incorporate in a variable controlling device, such as the main tuning controlling device of a radio receiver or transmitter, or in the adjusting device for other electrical or mechanical quantities, two sorts of scale, one of these scales being calibrated in units of the quantity concerned and the other in arbitrary units, the function of the latter being to provide a greater discrimination between graduations than with a scale not so provided. Such an arrangement facilitates the adjustment of the quantity concerned and also the re-setting of the adjusting device to a desired quantity.

Such a scale is usually referred to in the radio art as a logging scale and, when applied to a radio receiver, is required to have a sufficient developed length to enable stations on adjacent frequencies to be separately logged, and to be so clearly marked as to reduce the risk of error in readjustment to a particular frequency (that is to a particular transmitting station) to a negligible degree.

It is the object of this invention to provide a scale which shall satisfy the requirements set out above, whether particularly of a radio receiver or more generally of an adjusting device for some electrical or mechanical quantity.

According to the invention, a logging scale consists of two scale members each marked with a scale and so arranged that the two scales run in mutually perpendicular directions, the two members being so geared together that as one (the slow moving member) runs from one scale marking to the next (in either direction) the other (the fast moving member) runs through its whole range, and so disposed that the slow moving member is masked by the fast moving member which, however, is provided with a longitudinal aperture or transparent strip of in sufficient width to expose more than one scale marking on the slow member, the aperture or strip being so inclined to its direction of movement as to expose a scale marking on the slow member at the beginning of the run of the fast member, to follow the moving scale marking to the end of the run of the fast member, and then to obscure that marking and expose the next marking.

Preferably, the logging scale consists of a drum having marked on its cylindrical surface a series of equally spaced numerals and a disc bearing near its edge a decimal scale, for example, the drum and disc being severally mounted on or geared to mutually perpendicular spindles geared together by a gear having a desired ratio so that for one complete revolution of the disc the drum makes an angular movement equal to the angular spacing between successive scale markings, the drum and disc being so relatively mounted that the cylindrical surface of the former is adjacent to but masked by the latter which, however, is provided with a narrow spiral transparent strip of one convolution around its edge through which the said surface of the drum is visible, the width of the transparent strip being not substantially greater than the height of a scale marking on the said surface and its lesser radius being such that when the drum and discs are in such relative positions that the said surface is visible through the strip at its point of least radius a whole scale marking on the said surface is exposed, the rate of change of radius being such that the movement of the said exposed marking is followed by the strip throughout a revolution of the disc.

Figure 2:
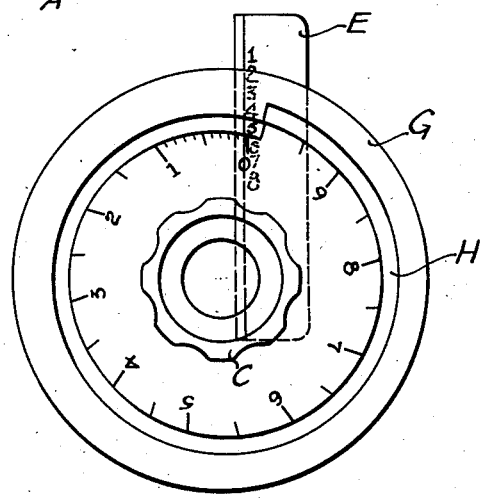
Figure 3:
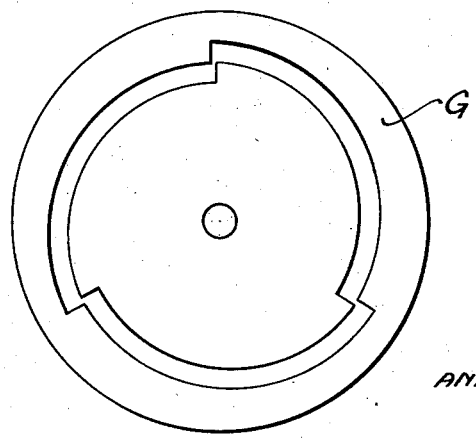

In the accompanying drawings, Figs. 1 and 2 are, respectively, side and front elevational views of a preferred embodiment of the invention, and Fig. 3 is a modified form of the disc element employed in Figs. 1 and 2.

Referring now to Figs. 1 and 2, the logging scale, as applied to a radio-receiver for tuning purposes, consists of a spindle F upon which is mounted or to which is geared a shallow drum E, bearing on its cylindrical surface a series of numbers 1, 2, 3 . . . to N (only 1 to 8 being shown in Fig. 2) equally spaced apart, and from which the tuning element such as a variable condenser (not shown) is driven. This first mentioned spindle F is driven at a slow rate by a main spindle K to which it is geared by means of a worm A and worm wheel gear B, the worm being on the main spindle which is furnished with the usual driving knob C.

The scale markings 1, 2, 3, etc. (shown in Fig. 2), on the cylindrical surface of the drum E are so spaced, that for one complete revolution of the main spindle K one scale marking standing at any fixed datum position (in practice the center of a viewing window) is replaced by one of the immediately adjacent markings, that is the next one on one side or the other of that under consideration.

Geared to or concentrically mounted upon the main spindle K is a circular disc G which bears upon its surface a circular scale also concentric with the axis of the main spindle. In the model of a logging scale under description, this circular scale was divided into ten main divisions 1 to 9 and 0, and each main division was again divided into ten sub-divisions.

Disc G is, in the main, opaque and is so situated, near to the cylindrical surface of the drum, that it masks the markings on the surface of the drum. It is, however, provided with a transparent strip H which surrounds the scale which it bears. This strip constitutes one convolution of a spiral and has a width not substantially greater than the heights of the markings on the drum, that is, not greater than the angular separation, at the surface of the disc, between such markings. The rate of change of spiral strip H is such that as disc G makes one complete revolution, one point on the surface of drum E is centered in the strip, and the angular positions of the drum and disc are so related that a desired marking on the drum (as in numeral 5, shown in Fig. 2) is centered in the strip for a particular zero setting of the disc and so remains until the disc shall have made a complete revolution when, by reason of the break in the spiral, the next marking (ahead or behind according to the direction of rotation) becomes centered in the strip.

The whole logging scale may be mounted on a panel D having a viewing window M across which, in the direction of movement of the markings on the drum may extend a cursor line against which the scale on the disc is read. Alternatively the drum may bear a line around its cylindrical surface which may serve as such cursor line.

The developed length of the scale may be expressed by $N\pi D$ where N is the number of scale markings on the drum and D is the mean diameter of the spiral.

In the particular model of the invention under description, there were 25 scale markings on the drum, extending around half its cylindrical surface, the developed length of the scale was 15'. An example of a reading is 10.67, the number 10 being the number on the drum visible through the spiral strip in the disc, and the number 67 being read from the scale on the disc. The accuracy of logging may be 1 part in 2500, or 0.072° of rotation of the tuning element.

The invention is susceptible of various modifications. Thus, instead of a complete convolution of a spiral around the disc, there may be a number $n$ (see Fig. 3 where $n=3$) of partial convolutions such that when the disc shall have made $1/n$ revolution one partial convolution ends and a second begins, the difference in the end of one partial convolution and the beginning of the next being equal to the distance between centers of the markings on the drum. Thus, for one complete revolution of the disc $n$ successive markings on the drum will be exposed, each remaining exposed for $1/n$ of a revolution and then being replaced by the next.

Again, although in the specific model described above a drum and disc have been described, involving mutually perpendicular spindles, two discs involving parallel spindles may be employed. In both these arrangements rotary movement of the scale members is involved. However, the two members may be arranged for rectilinear movement in mutually perpendicular directions as by being formed as plates or strips, the latter being, if desired, continuous or discontinuous. If discontinuous they may be arranged to be wound onto rollers.

What we claim is:

1. A logging scale comprising two scale members each marked with a scale and so arranged that the two scales run in mutually perpendicular directions, the two members being so geared together that as one (the slow moving member) runs from one scale marking to the next (in either direction) the other (the fast moving member) runs through its whole range, and so disposed that the slow moving member is masked by the fast moving member which, however, is provided with a longitudinal aperture or transparent strip of insufficient width to expose more than one scale marking on the slow member, the aperture or strip being so inclined to its direction of movement as to expose a scale marking on the slow member at the beginning of the run of the fast member, to follow the moving scale marking to the end of the run of the fast member, and then to obscure that marking and expose the next marking.

2. A logging scale as claimed in claim 1, comprising a drum having marked on its cylindrical surface a series of equally spaced numerals and a disc bearing near its edge a (for example) decimal scale, the drum and disc being severally mounted on or geared to mutually perpendicular spindles geared together by a gear having desired ratio so that for one complete revolution of the disc the drum makes an angular movement equal to the angular spacing between successive scale markings, the drum and disc being so relatively mounted that the cylindrical surface of the former is adjacent to but masked by the latter which, however, is provided with a narrow spiral transparent strip of one convolution around its edge through which the said surface of the drum is visible, the width of the transparent strip being not substantially greater than the height of a scale marking on the said surface and its lesser radius being such that when the drum and discs are in such relative positions that the said surface is visible through the strip at its point of least radius a whole scale marking on the said surface is exposed, the rate of change of radius being such that the movement of the said exposed marking is followed by the strip throughout a revolution of the disc.

3. A logging scale as claimed in claim 1 mounted on a panel having a viewing window across which, in the direction of movement of the markings on the drum may extend a cursor line against which the scale on the disc is read.

4. A logging scale as claimed in claim 1 mounted upon a panel having a viewing window, wherein the drum bears a line around its cylindrical surface which may serve as such cursor line centered across the said window.

5. A logging scale as claimed in claim 1 but wherein instead of a complete convolution of a spiral around the disc, there may be a number $n$ of partial convolutions such that when the disc shall have made $1/n$ revolution one partial convolution ends and a second begins, the transverse difference in the end of one partial convolution and the beginning of the next being equal to the distance between centers of the markings on the drum, so that for one complete revolution of the disc $n$ successive markings on the drum will be exposed, each remaining exposed for $1/n$ of a revolution and then being replaced by the next.

GEORGE LAMBERT GRISDALE.
WILLIAM JOHNSTON,
Executor of Harry Cecil Norwood, Deceased.

REFERENCES CITED

The following references are of record in the file of this patent:

UNITED STATES PATENTS

| Number | Name | Date |
|---|---|---|
| 2,085,192 | Hayward | June 29, 1937 |
| 2,339,904 | Almquist | Jan. 25, 1944 |
| 2,348,391 | Kester | May 9, 1944 |